Sept. 30, 1969 W. L. McCANN 3,469,497
MULTIPLE TABLE SWIVELING WORK SUPPORT
Filed Jan. 3, 1968 10 Sheets-Sheet 1

INVENTOR
WALTER L. McCANN by: Wolfe, Hubbard, Voit & Osann
ATTY.

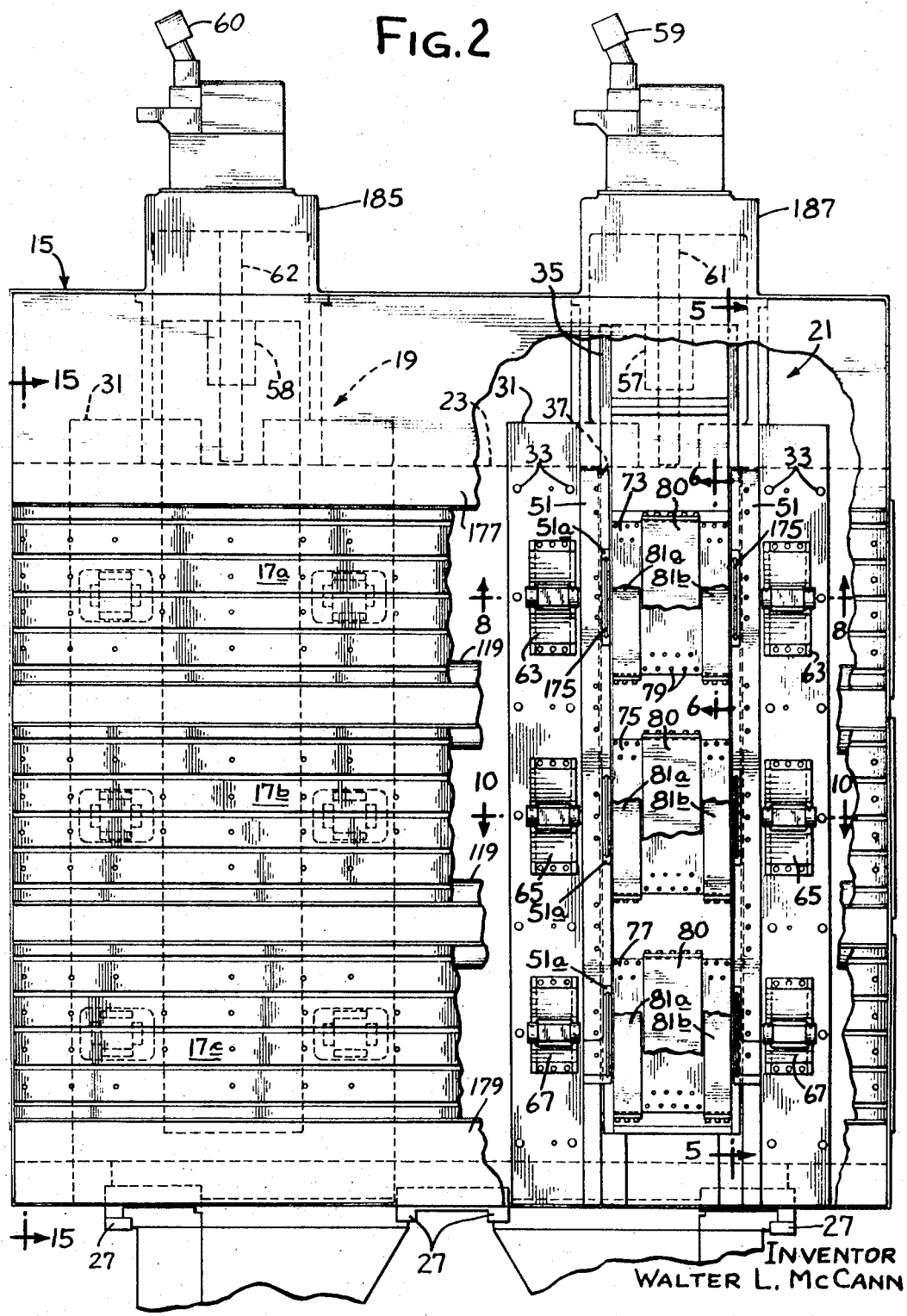

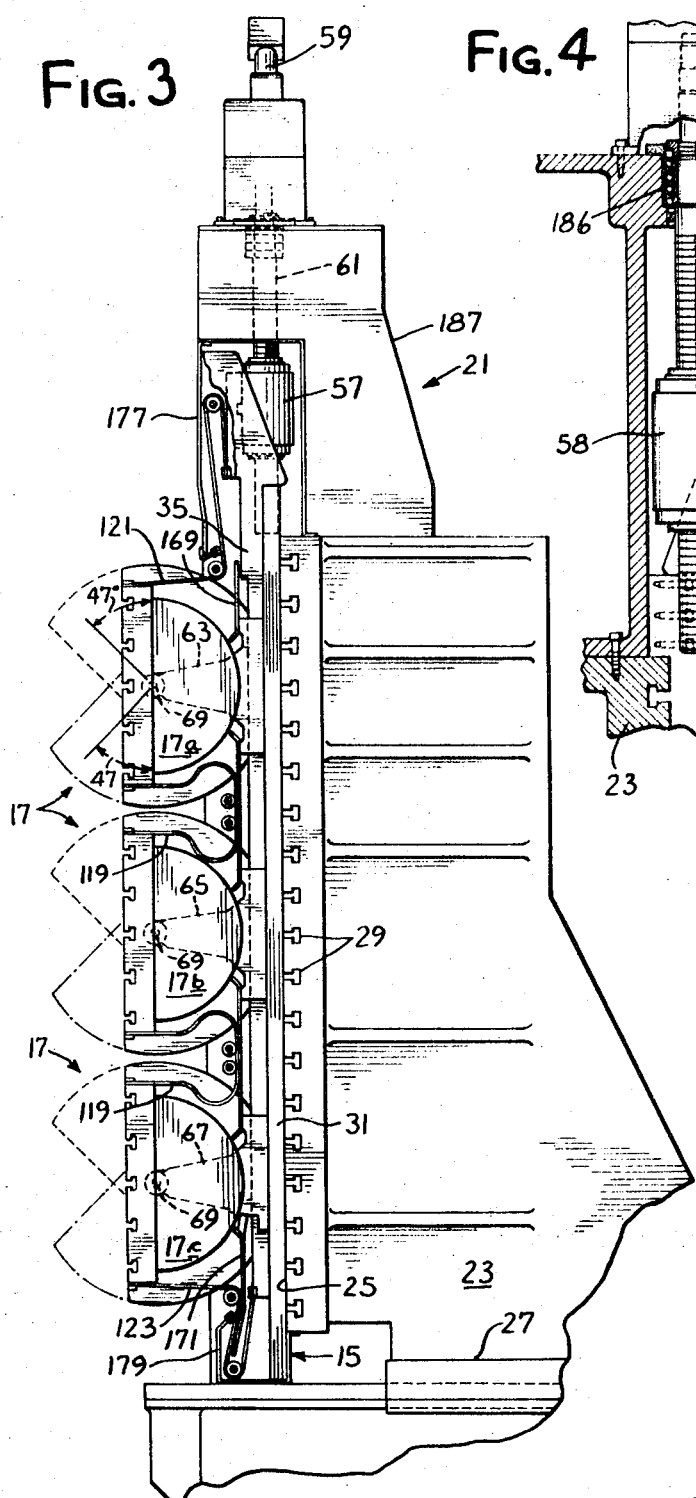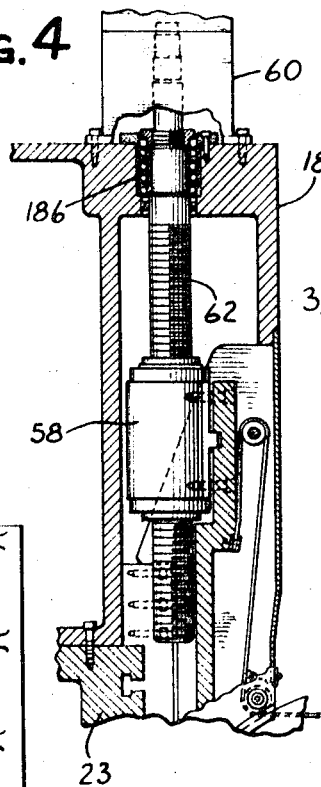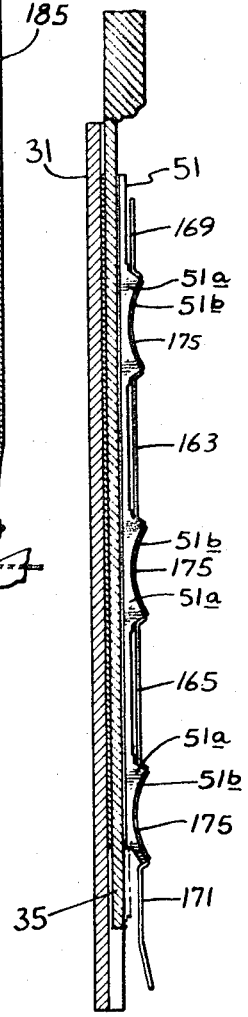

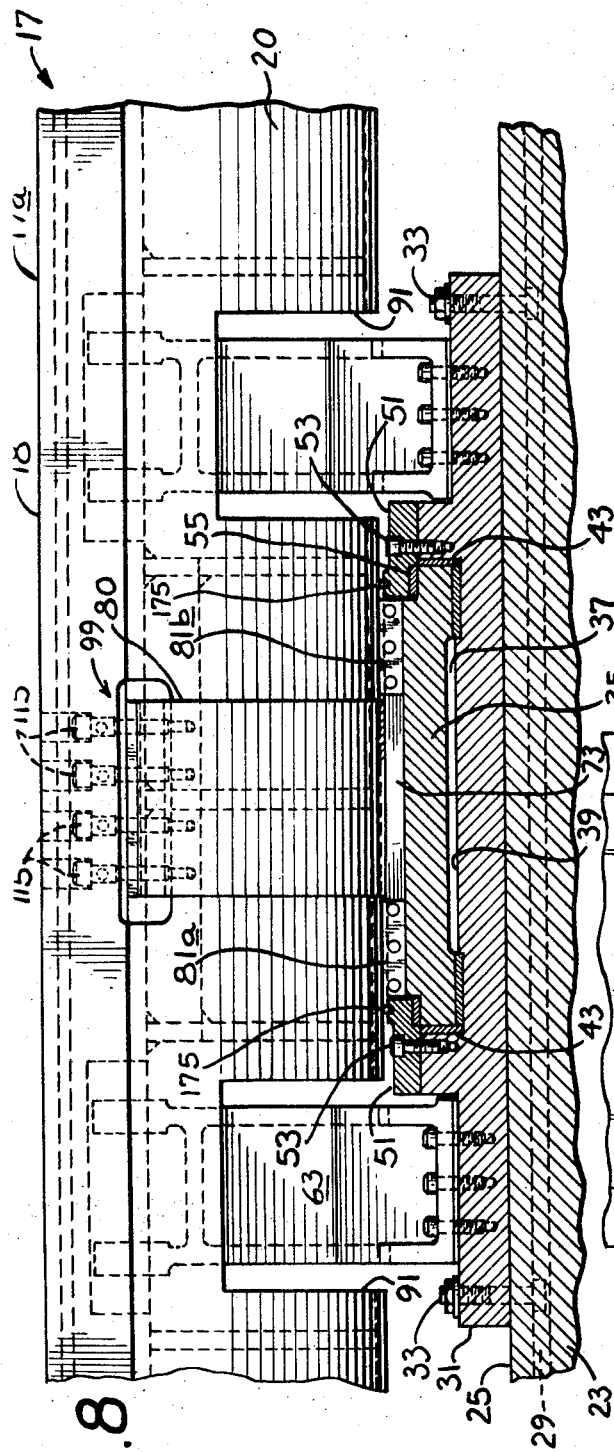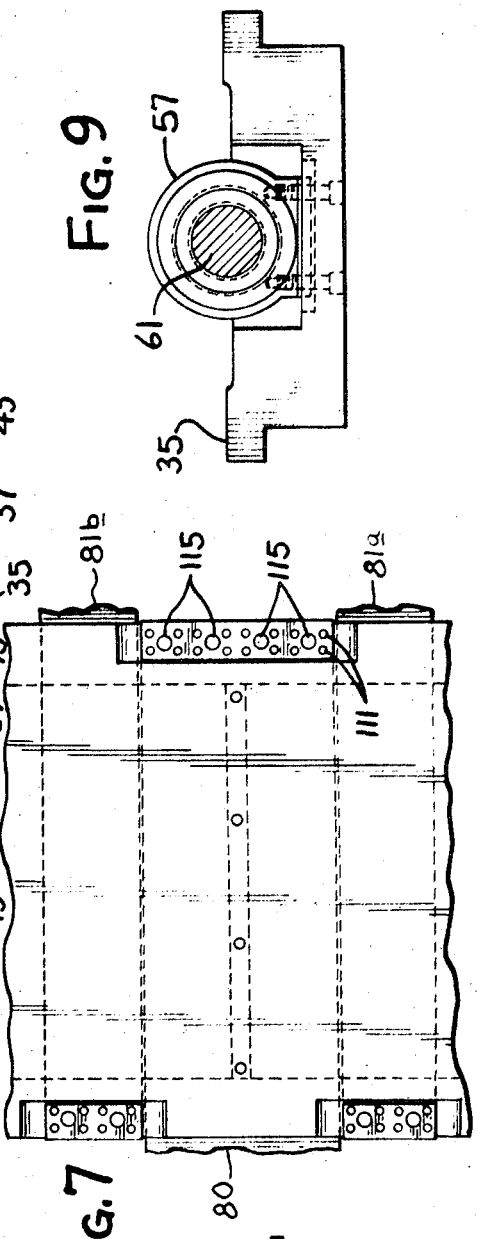

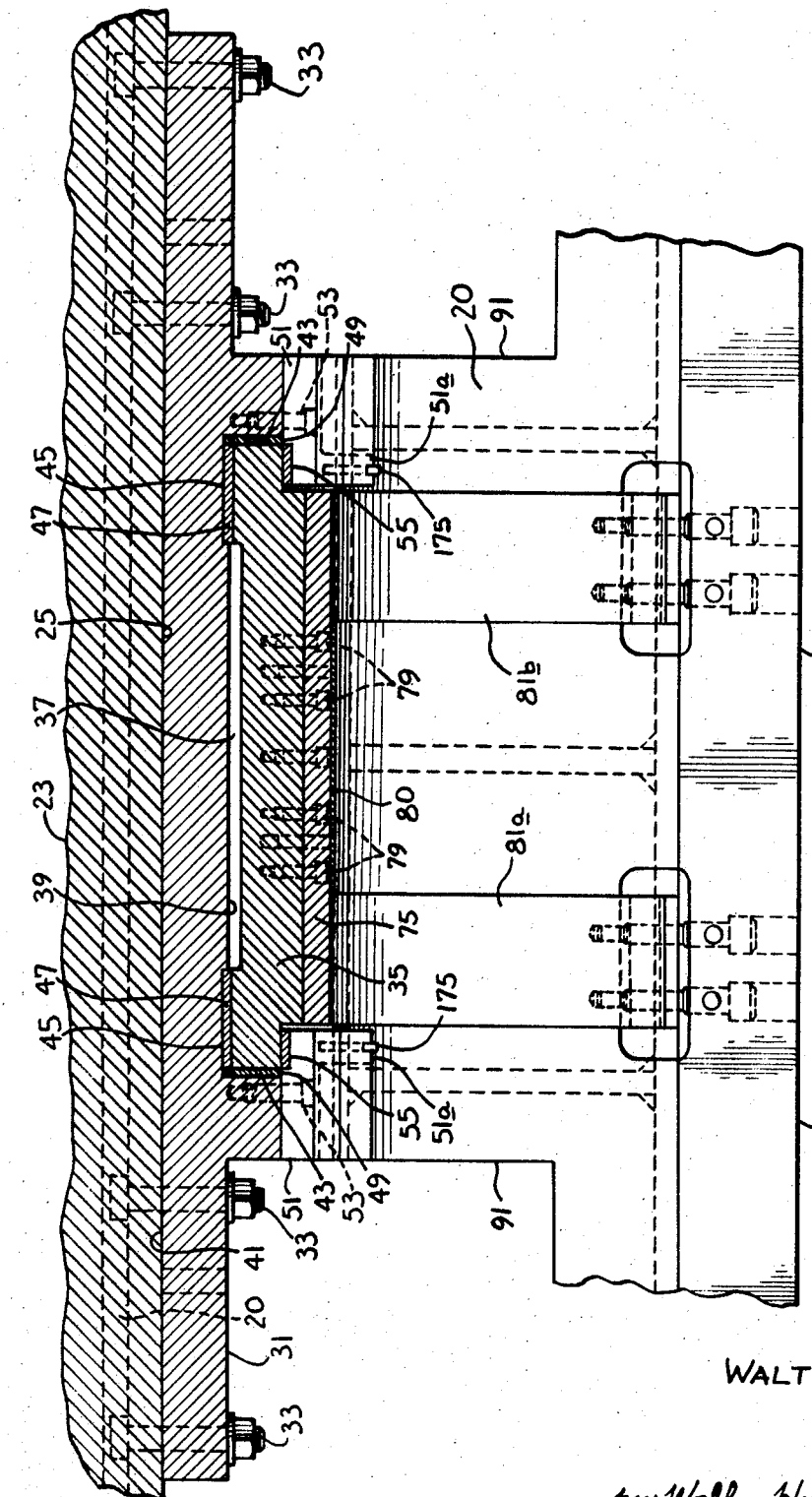

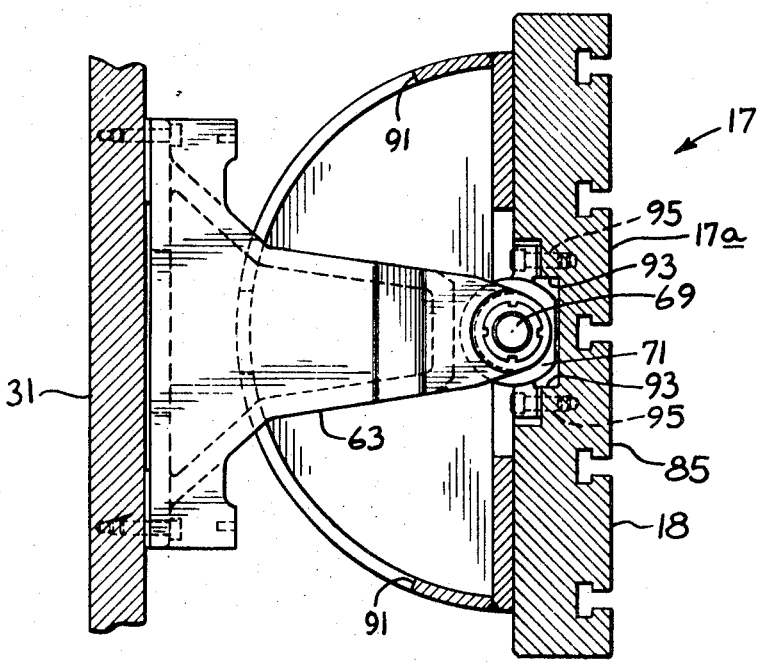
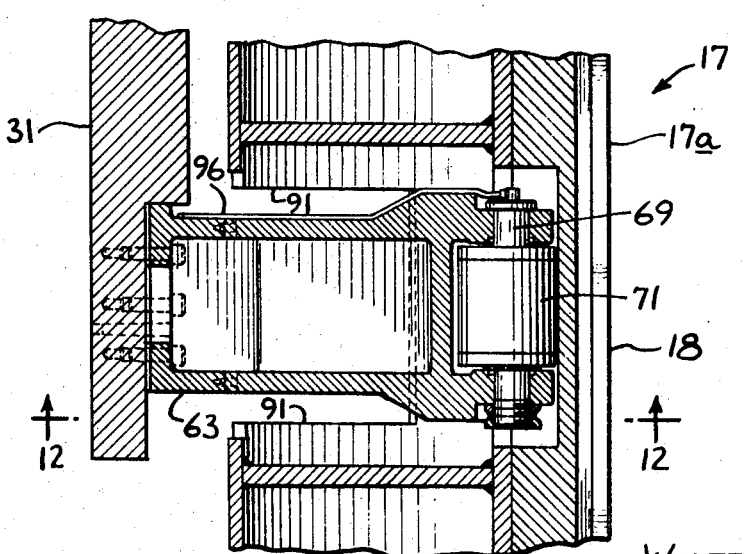

Sept. 30, 1969 W. L. McCANN 3,469,497
MULTIPLE TABLE SWIVELING WORK SUPPORT
Filed Jan. 3, 1968 10 Sheets-Sheet 9

INVENTOR
WALTER L. McCANN
by: Wolfe, Hubbard, Voit & Osann
ATTYS.

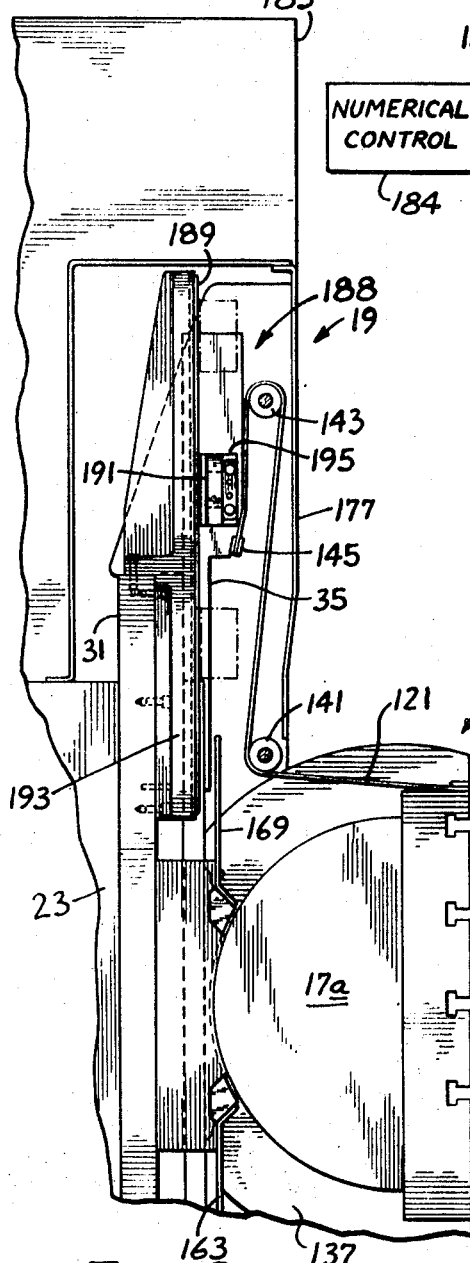
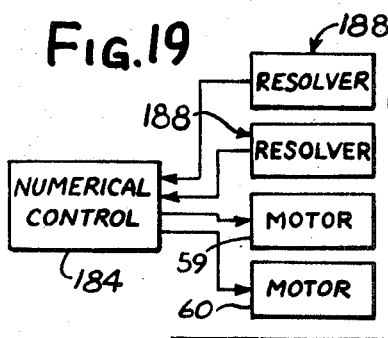
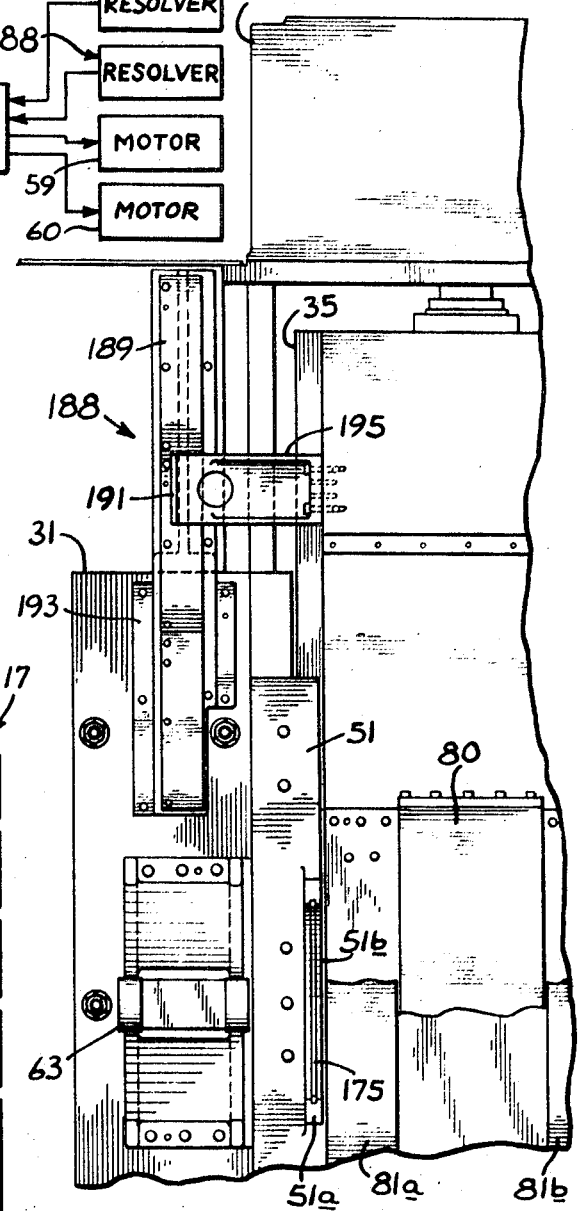
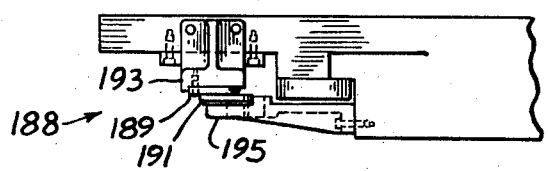

United States Patent Office 3,469,497
Patented Sept. 30, 1969

3,469,497
MULTIPLE TABLE SWIVELING WORK SUPPORT
Walter L. McCann, Fond du Lac, Wis., assignor to Giddings & Lewis, Inc., Fond du Lac, Wis., a corporation of Wisconsin
Filed Jan. 3, 1968, Ser. No. 695,429
Claims priority, application Great Britain, May 2, 1967, 20,397/67
Int. Cl. B23c 7/00
U.S. Cl. 90—58    14 Claims

ABSTRACT OF THE DISCLOSURE

A series of horizontally extending work tables are pivotably mounted in a vertical array upon a pair of laterally spaced support columns mounted on a vertical support surface. Steel bands anchored on slides moving along the support columns swival the tables in unison. Two layers of shielding are provided against contaminants, an outer layer of rubber sheets attached to the edges of the tables, and an inner layer formed of a set of recessed trays and intersecting walls.

---

The present invention relates to multiple axis milling machine tools and in particular to an improved apparatus for providing a plurality of work-supporting surfaces for such machine tools.

A conventional multiple axis milling machine has a single spindle adapted to hold and rotate a single milling tool at some angle relative to a workpiece. The workpiece to be milled is mounted on a vertical work-supporting surface, and the spindle is mounted for vertical and horizontal movement in a plane parallel to the work-supporting surface, and also for horizontal movement toward and away from the work-supporting surface. Fourth and fifth axes of movement for the spindle are provided by mounting it for swinging movement in horizontal and vertical planes.

It has been proposed to increase the capacity of such a machine, which is capable of milling only a single part at a time, by providing an assembly of several vertically spaced spindles driven by the same motor which drives the original spindle so that the individual vertically stacked spindles may simultaneously machine a corresponding number of parts mounted on a common work surface. It has been found, however, that when such an array of turrets is used, the assembly cannot be made to move along all five axes described above. In particular, it has been found that if a vertically ganged array of spindles is swung in a vertical plane, which is at right angles to the work-supporting surface, the respective spindles below and above the axis of rotation will move in opposite directions relative to the common work surface upon which their corresponding workpieces are mounted and will therefore be differently positioned relative relative to their respective workpieces as well.

It is the central object of the present invention to provide a solution to the problem found when a single spindle machine is sought to be converted into a multi-spindle machine by providing a work support which includes means for individually moving and accurately orienting several workpieces about individual mutually parallel axes which lie in a common plane so that, as the individual workpieces are rotated about their respective axes, their positions relative to the respective tools used to machine them are changed in unison over their full range of movement.

A more specific object of the invention is to provide an improved drive for turning several vertically stacked work tables in precise unison and in particular to eliminate variances between the positions of respective ones of the work tables. It is a related object of the invention to maintain the accuracy of the improved work support unimpaired in the presence of flying metal chips and splashing coolant occurring during machining operations.

A further object of the invention is to accurately indicate the attitudes of the individual work surfaces as they are swung through their full range of travel.

Other objects and advantages will become apparent from the following description and from the accompanying drawings in which:

FIG. 2 is a front view of a multi-table work support of the type shown in FIG. 1, partially broken away to show the drive mechanism for the tables;

FIG. 3 is a right side view of the multi-take work support illustrated in FIG. 2, with a side panel removed to show protective flexible shield members attached to the several tables;

FIG. 4 is a left side sectional view of the top portion of the multiple table work support illustrated in FIG. 2 with the left side panel removed to show in greater detail the nut-and-screw drive incorporated in one of the drive columns supporting the tables;

FIG. 5 is a cross-section, taken along the lines 5—5 of FIG. 2, showing the slide mounted in one of the support columns shown in FIG. 2 and the shielding arrangement mounted between the work tables and the slide;

FIG. 7 is a cross-section, taken along the lines 7—7 of FIG. 6, showing the manner in which the drive bands are attached to the underside of the work table;

FIG. 8 is a cross-section, taken along lines 8—8 of FIG. 2, viewing from the bottom one of the work tables held by brackets upon one of the support columns and also illustrating the center one of the three drive bands wound around the bottom portion of the table;

FIG. 9 is a top view of the slide showing the manner in which the nut member shown in FIG. 4 is attached to the slide;

FIG. 10 is a cross-section, taken along lines 10—10 of FIG. 2, viewing from the top one of the work tables, and illustrating the two side bands for driving that work table;

FIG. 11 is a section of a bracket for mounting one of the work tables upon a support column;

FIG. 12 is a cross-section, taken along the lines 12—12 of FIG. 11, showing the clearance between the work table and the bracket upon which it is mounted;

FIG. 16 is a left side view of the top portion of the apparatus shown in FIG. 2, with the left side plate removed to reveal the position detecting device mounted upon the slide in the left support column;

Figure 1:
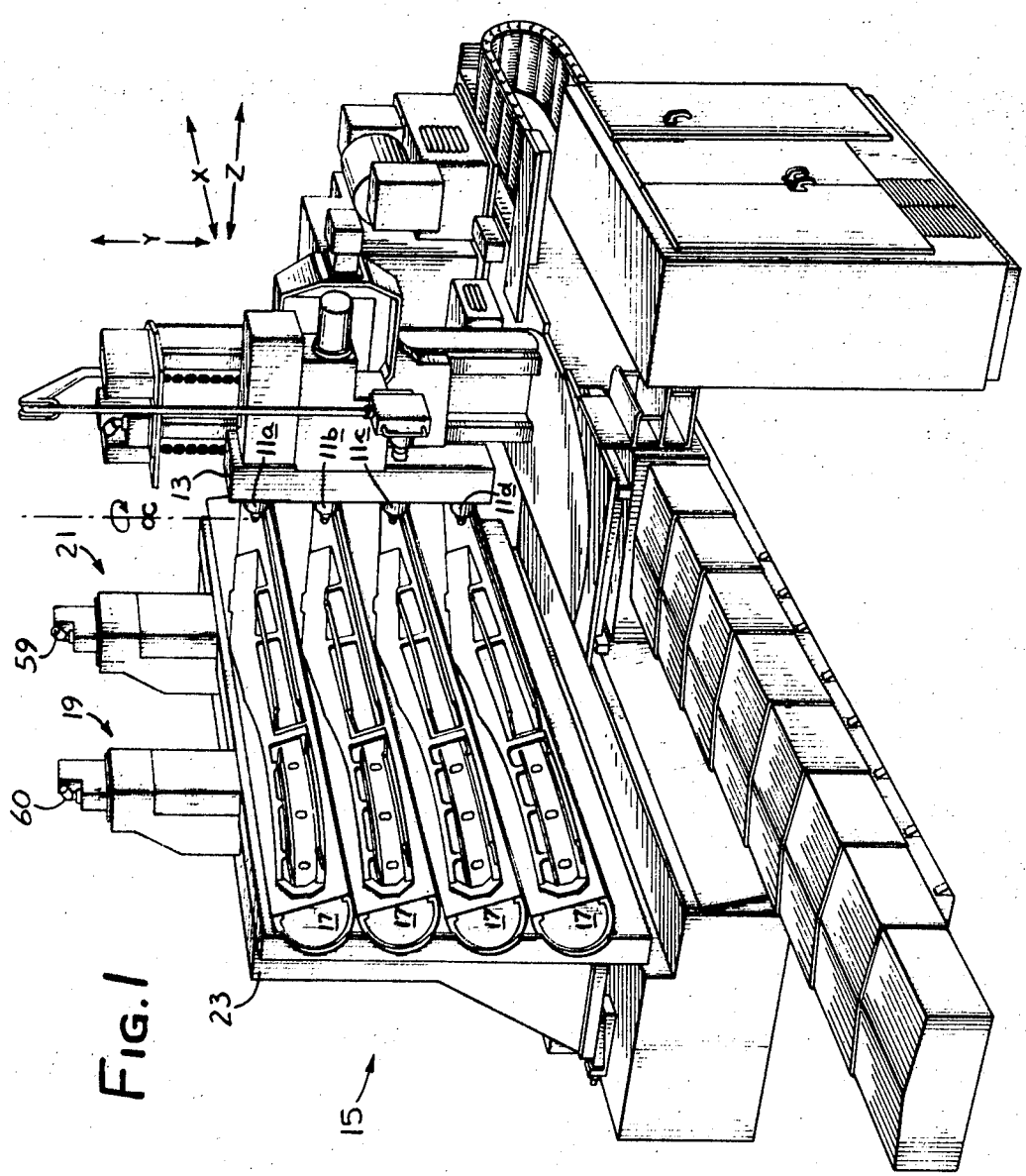
FIG. 1 is a pictorial view of a multi-spindle milling machine incorporating features of the invention.

FIG. 17 is a front view of the top portion of the left support column illustrated in FIG. 2 with the work support table mounted thereon being removed for clarity and showing further the position sensing device illustrated in FIG. 16; and FIG. 18 is a top view of the portion of the support column illustrated in FIGS. 16 and 17 showing the relative positions of respectively movable portions of the position sensing device illustrated therein.

FIG. 19 is a simplified block diagram indicating the manner in which the fixture illustrated in FIGS. 1–18 may be connected to a numerical control unit.

While the invention is susceptible of various modifications and alternative constructions, there is shown in the drawings and will herein be described in detail a preferred embodiment. It is to be understood, however, that it is not thereby intended to limit the invention to the specific form disclosed. On the contrary, it is intended to cover all modifications and alternative constructions falling within the spirit and scope of the invention as expressed in the appended claims.

Referring more particularly to the drawings, a multi-turret milling machine incorporating the invention is illustrated in FIG. 1. The milling machine shown has four vertically stacked horizontal spindles 11a–11d housed in common spindle head 13. By means not shown in detail the spindle head 13 may be moved along any of the three mutually orthogonal axes X, Y and Z and may be turned about the vertical axis α. In accordance with the invention relative movement between a plurality of parts and respective ones of the spindles 11 about individual horizontal axes is provided by a multi-surface work holding fixture 15 comprising a plurality of work tables 17 pivotably mounted upon a pair of laterally spaced support and drive columns 19 and 21. The tables are mounted for swiveling about individual horizontal axes distributed vertically in a common vertical plane lateraly spaced from the spindles 11, and are swiveled about their respective axes in unison by means of slides in the support and drive columns to which they are connected by appropriate coupling means. The support and drive columns are attached to a conventional angle plate 23 which forms part of the milling machine with which the attachment is to be used.

It will be understood, that the number of work tables may be more or less than four, depending on the number of spindles carried by the machine tool. Indeed in the detailed description that is to follow, the invention will be described as including an array of three swivel-type work tables.

As best seen in FIGS. 2 and 3, the angle plate 23 has a vertical work support surface 25 and is slidable toward and away from the spindles 11 on guideways 27. The adjustment of the angle plate 23 by way of movement along the guideways 27 is generally useful only during set up and is not normally changed during a machining operation, relative to and from movement between the parts to be machined and the array of spindles being limited to the spindles.

To facilitate the mounting of workpieces upon the angle plate 23 its generally flat work surface 25 is interrupted by vertically spaced and horizontaly extending T-slots 29. In practicing the present invention the T-slots 29 are used for securing the work holding fixture 15.

The work fixture 15 is attached to the work surface 25 by means of fastening devices which secure the support and drive columns 19 and 21 to the work surface 25. The columns 19 and 21 serve a three-fold purpose. First, as just described, they hold the fixture 15 securely upon the work surface 25. Secondly, they contain the driving mechanisms whereby the tables 17 are swiveled in unison. Thirdly, it is the support and drive columns 19 and 21 upon which all of the tables 17 are pivotably mounted.

The table support and drive columns 19 and 21 may be essentially identical and therefore only one of them, the column 21 will be described. It is shown in FIGS. 2, 3, 8 and 10 and includes a long upright base 31 with two series of bolt holes running along each of its two opposite flanges and aligned with the T-slots 29 of the angle plate 23 for mounting thereon by a set of bolts 33. Mounted for movement along the longitudinal axis of the base 31 is a slide member 35 housed in the preferred embodiment of the invention in a recessed channel disposed centrally within and running along a substantial portion of the base 31. As best seen in FIGS. 8 and 10, the channel 37 is defined by a bottom wall 39 generally parallel to the rear face 41 of the base 31 and by a pair of side walls 43 extending at right angles to the rear face 41. Extending along opposite ends of the bottom wall of the channel 37 are a pair of guideways 45 lined with plastic wear strips 47 at the bottom and 49 at the sides. The slide 35 is retained within the channel 37 by a pair of plates 51 which overlap the slide 35 and which are secured to the base 31 as by screws 53. Those portions of the retaining plates 51 which extend over the slide 35 are lined with wear strips 55 so that all surfaces of the slide 35 move upon wear strips and metal to metal rubbing contact is avoided.

Driving power for moving the slide 35 along its base 31 is provided through a double ball nut 57 bolted upon the slide 35 at its upper end (FIG. 9) and driven by an individual servomotor 59 through a screw 61 preloaded against the double ball nut to eliminate backlash. The slide in the other column 19 is identically driven by a separate servomotor 60 through a screw 62 and a double ball nut 58 (FIGS. 2 and 4). It will be understood, of course, that appropriate speed reduction gear drives are interposed between each servomotor and the screw which it drives.

The three vertically stacked tables 17 are pivotably mounted on six pairs of brackets extending laterally from the drive columns 19 and 21, with two pairs of brackets, a pair on each drive column, engaging each of the three tables. Each of the two columns 19 and 21 carries three vertically spaced pairs of brackets, those carried by the column 21 being shown as the members 63 at the top, 65 at the middle, and 67 at the bottom. Anchored in each of the pairs of brackets 63, 65 and 67 is a pivot pin 69 extending through a journal block 71 mounted upon the table 17 (FIG. 11). Each pair of brackets 63, 65 and 67 spans the channel 37 containing the slide member 35, the respective brackets of each pair being bolted on opposite flanges of the base 31 (FIG. 8), so that the bearing axes of the respective pairs of brackets are parallel to one another and perpendicular to the longitudinal axis of the channel.

In each column 19 and 21, the function of the slide 35 is to apply a swiveling or turning force to the work tables 17. To transmit the rectilinear motion of the slides to the tables coupling means in the form of bands, preferably of heavy spring steel, are provided. The bands are attached at one of their ends to respectively ones of the tables 17 and are attached at their other ends to one of the slides 35. In accordance with the invention the tables 17 have cylindrical rear surfaces, and each table is coupled to each of the slides 35 by at least a pair of bands wrapped in mutually opposite directions around the rear surface of the table so that as the slide 35 is moved up or down in its channel 37, the table 17 is caused to pivot about the axes of its respective journal blocks.

Secure attachment of the coupling straps to the slider 35 is provided by a series of vertically spaced anchor blocks on each of the slides, corresponding in number and in spacing to the number and position of the tables 17 to be driven. As shown in FIGS. 2 and 10, three anchor blocks 73, 75 and 77 are bolted on the slide 35 by screws 79 and are positioned between the respective bracket pairs 63, 65 and 67. Attached to each of the anchor blocks 73–77 is a group of spring steel bands, with the group of bands of each driving block being drivingly attached to one of the work tables 17. Referring in particular to the middle anchor block 75 and to its associated drive bands, in accordance with the preferred embodiment of the invention a center band 80 is anchored at one edge of the block, and a pair of narrower bands 81a and 81b extending along opposite sides of the center band 80 are anchored at the opposite end of the block (see FIGS. 8 and 10). As will appear shortly, the central drive band 80 is attached to one edge of one of the tables 17 and serves to rotate the table about its pivot axis in a first direction while the narrower drive bands 81a, 81b are attached to the opposite edge of the table and serve to rotate it in an opposite direction. Since the pair of narrower bands 81a and 81b together perform the same function which is done alone by the central drive band 80, in the preferred embodiment of the invention, their combined cross-sectional areas are equal to that of the central drive band 80.

Figure 6:
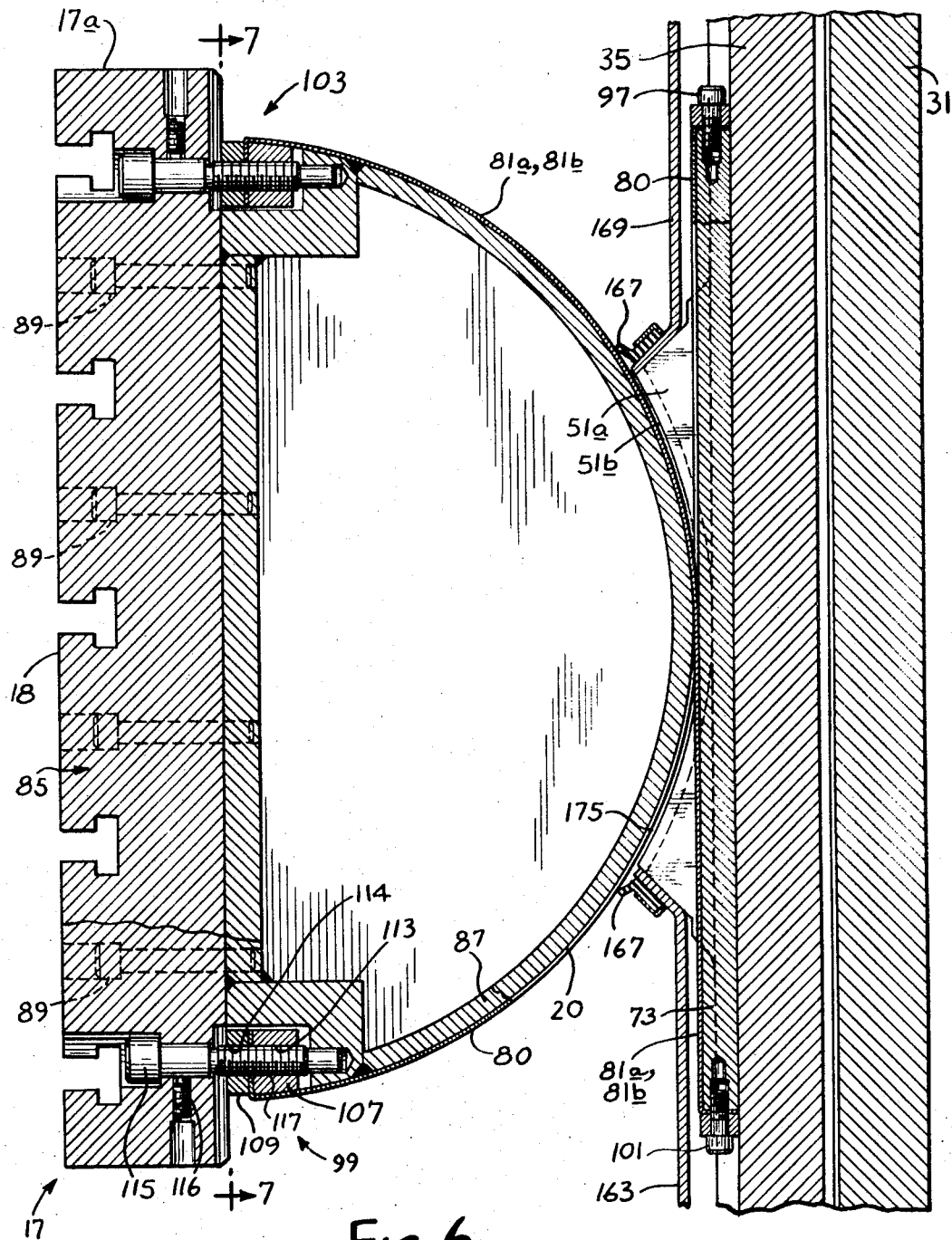
FIG. 6 is a magnified cross-section, taken along the lines 6—6 of FIG. 2 showing in detail one of the work tables, the drive bands for swiveling the table, and the shielding arrangement for protecting the drive bands.

Turning now to the construction details of the work tables 17 and to the manner in which the drive bands 80 and 81a, b, are attached to them, particular reference will be made to FIG. 6 of the drawings which is a cross-section through the top work table, 17a, opposite the top anchor block 73 mounted on the right support and drive column 21 as viewed in FIG. 2. As seen therein, the work tables 17 have a generally flat front working surface 18 and a cylindrical rear surface 20. These surfaces are formed in the exemplary embodiment by a work plate 85 and a drum 87 bolted together by a set of screws 89 to form a single unit. The drum 87 is semicylindrical in shape, substantially coextensive with the work plate 85 and is provided with cutouts 91 (FIG. 8) distributed along its length to provide clearance for the brackets 63, 65, and 67 as the table is swiveled through its full range of movement, shown in FIG. 3 as 47° in either direction from the vertical. As indicated previously with reference to FIGS. 11 and 12, the tables 17 swivel about pivot pins 69 which extend through journal blocks 71 mounted upon the tables. The semicylindrical rear surface of each table 17 is generated about an axis which coincides with the axes of the journal blocks 71 upon which it is mounted. As seen in FIG. 12, the undersides of the work plates 85 are formed with recessed pads 93 to which the journal blocks 71 are secured by means of bolts 95. A suitable lubricant may be supplied to the journal locks 71 through a conduit 96, as shown in FIG. 11.

Referring again to FIG. 6, the central drive band 80 is bent over at its top end and is attached to the top edge of the anchor block 73 by a series of bolts 97. The band then extends downwardly along the surface of the anchor block 73 and is wrapped clockwise tightly around the rear surface 20 of the table 17 formed by the drum 87. Finally, at its opposite end the drive band 80 is bent once again and is held securely to the underside of the table 17 by means of an adjustable tensioning clamp 99. In a similar manner each of the pair of side drive bands 81a, b, is bent at its bottom end and is attached to the bottom edge of the anchor block 73 by a series of bolts 101. The side drive bands 81a, b, then extend upward along the surface of the anchor block 73 and are wound counterclockwise around the surface of the drum 87 and are bent at their opposite ends and held securely to the top edge of the drum 87 by a pair of adjustable tensioning clamps 103.

The adjustable clamp 99 securing the central drive band 80 to the drum 87 comprises a pair of clamping plates 107 and 109. The drive band 80 is fastened between the clamping plates 107 and 109 by two rows of screws 111 as seen in FIG. 7. Additionally, the clamp plate 107 includes a series of four threaded apertures 113, and the clamp plate 109 has a corresponding set of four threaded apertures 114 which are aligned with the apertures 113. Each pair of aligned apertures 113 and 114 receives a bolt 115 having a head seated in a recess in the work plate 85 and having a threaded shank 117 screwed into the threaded apertures 113, 114. In the illustrated embodiment four such bolts 115 are distributed along the length of the clamping plates 107 and 109 and by turning these bolts 115 the clamping plate may be caused to travel along the length of the bolts 115 toward the underside of the work plate 85. In this manner the tension of the drive band 80 may be adjusted. By means of locking screws 116, the bolts 115 may be locked so as to maintain the band tension as selected. The adjustable clamps 103 by which the side bands 81a, b are attached to the drum 87 may be identical in construction with the clamp 99 just described, except that they are half as long, and consequently, they need not be described.

Summarizing the foregoing description of the support and drive means for the vertically stacked work tables 17, each table is supported on two pairs of spaced apart brackets, one pair of such brackets being mounted on each of the two support and drive columns 19 and 21. The tables 17 are pivotably mounted on the support brackets 63, 65, 67 by means of pivot blocks 71 anchored in the backside of the tables and by means of pivot pins 69 extending through the pivot blocks and anchored in the brackets. Each of the tables 17 is swiveled about its pivot axis on the bracket by means of two groups of drive bands, each group including a central band 80 and a pair of side bands 81, the respective ones of the two groups being located on different ones of the drive columns 19 and 21. Each group of drive bands is attached to a vertically movable slide 35 in a drive column by means of an anchor block 73, 75, 77 located between a pair of the supporting brackets 63, 65, 67. Each such group includes a central drive and 80 wrapped around the drum-shaped backside of the table 17 in a first direction and attached near one edge of the table, and an additional pair of drive bands 81 located on opposite sides of the central drive band 80 and wrapped tightly around the backside of the table 17 in a direction opposite to that of the central drive band 80 and attached to the other side of the table. Thus, as the two slides 35 in the drive columns 19 and 21 are moved up and down by means of the screw and nut drives 57, 61 and 58, 62 the table 17 is swiveled in one or the opposite direction by means of the two groups of drive bands. Since there are several work tables stacked one above the other, a corresponding series of groups of drive bands are mounted in a vertically stacked arrangement on both of the drive column slides 35 so that as the slides are moved up or down, all of the tables are swiveled in unison. By proper adjustment of the tensioning devices 99 and 103 substantially all backlash, which might be present if a gear drive were employed to transmit motion from the driving screws 61, 62 may be eliminated. As a result the table surfaces can be maintained parallel to one another within close limits throughout their range of travel. An additional benefit derived from the elimination of backlash with the present band drive is that delays which are usually caused by such backlash to occur between a reversal in the motion command signals being applied to the servomotors 59 and 60, and the response of the tables 17 to such a reversal is eliminated.

It will be understood by those skilled in the art that the number of support columns, brackets, drive band groups, and servodrives used may be varied and will be determined by the length of the tables 17. Thus, the number of support columns may be increased from the two shown, 19 and 21, to accommodate tables requiring additional support without departing from the scope of the invention.

In accordance with another important feature of the invention, means are provided for fully enclosing the band drive mechanism by which the tables are swiveled so as to exclude flying chips, splashing coolant, and other contaminants which might interfere with its operation and which might affect its accuracy. To this end flexible shields 119, preferably of neoprene, are provided to enclose the spaces between the tables 17 (FIG. 3). Additionally, there is provided a flexible shield 121 to close off the area generally above and behind the top one of the tables 17 and a further flexible shield 123 is mounted between the lower edge of the bottom table and the slide 35 to complete the protective shield. All of the flexible shields, 119, 121 and 123 are looped through guide slots located in a vertical plane lying between the axes of rotation of the tables 17 and the support columns 19 and 21, so that as the tables are swiveled about their respective axes, the protective shields move with them so as to provide at all times in combination with the tables between them a continuous, substantially unbroken surface from the top of the fixture 15 to its bottom.

Figure 13:
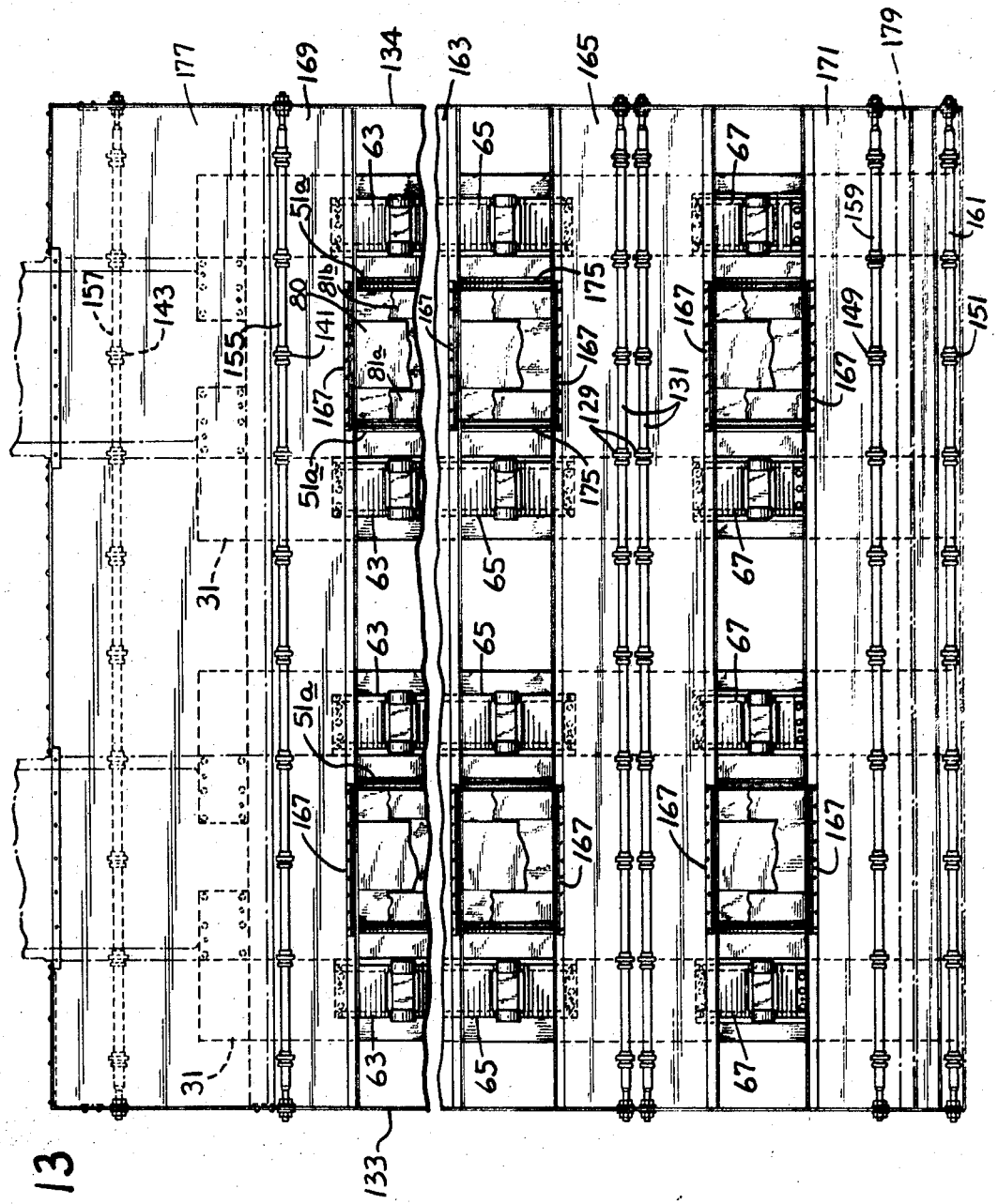
FIG. 13 is a front view of the apparatus illustrated in FIG. 1, similar to FIG. 2 but with the work tables and their flexible shields removed to reveal some of the second-layer shielding devices located behind the tables.
Figure 14:
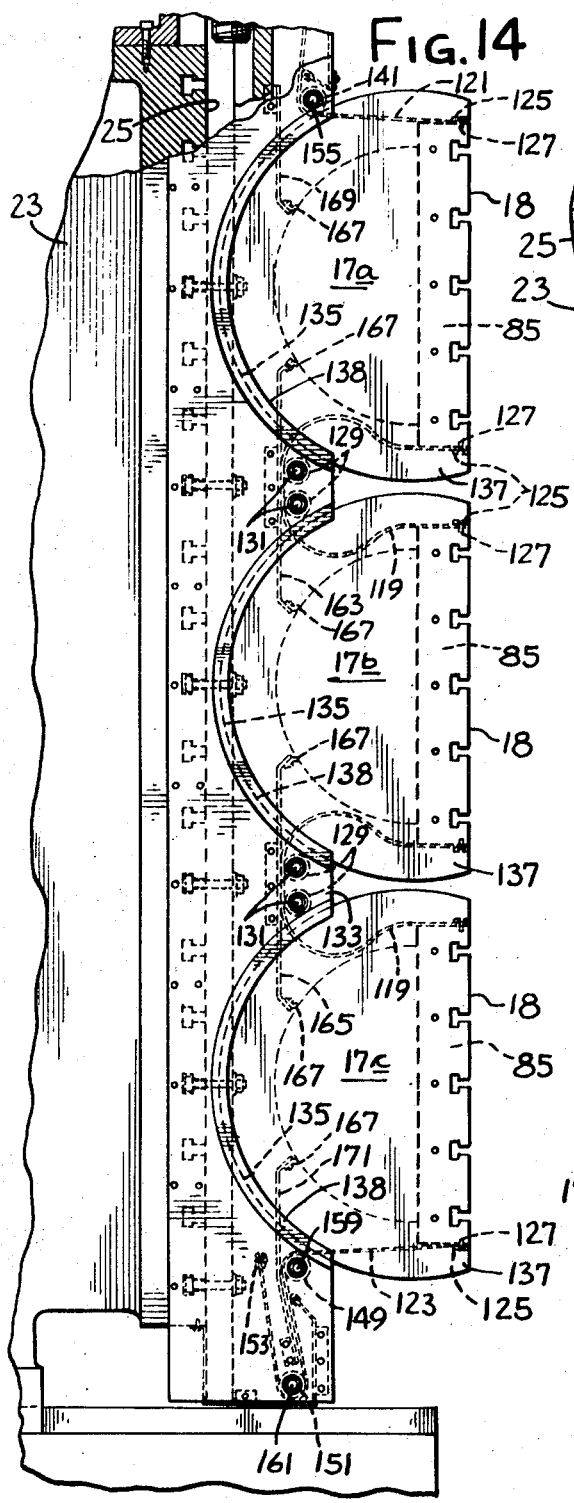
FIG. 14 is a left side view of the apparatus illustrated in FIG. 1 showing the pivotable tables in their center positions and the flexible shields at their rest positions.
Figure 15:
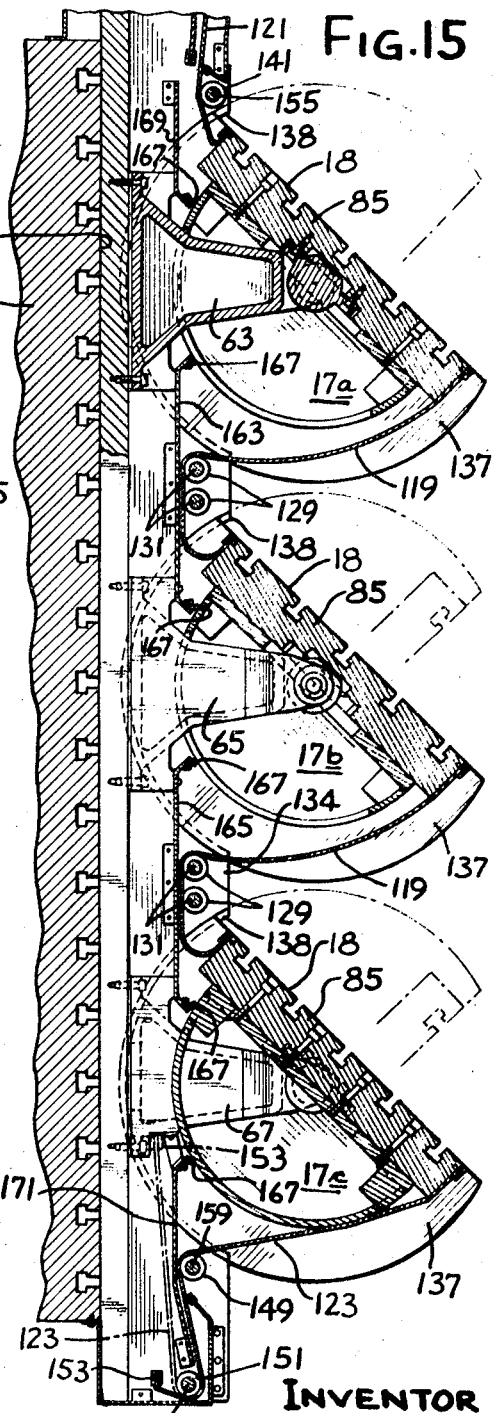
FIG. 15 is a longitudinal cross-section, taken along the lines 15—15 of FIG. 2, showing the tables in their extreme counterclockwise positions and the flexible shields in their fully paid out positions.

Referring now to FIGS. 13, 14 and 15 for a more detailed description of the shielding arrangement employed in the exemplary embodiment of the invention, the inter-table shields 119 are rectangular sheets substantially coextensive with the tables 17 in length, with respective ones of the sheets extending in width between and attached to adjacent ones of the tables. The shields 119 are attached to the edges of the tables 17 by means of clamping strips 125 extending substantially along the lengths of the tables and fastened thereto by means of screws 127. The sheets are then looped around guide rollers 129 mounted on bars 131. These bars, best seen in FIG. 13, extend the full length of the tables 17 and are supported at their ends by a pair of spaced apart, parallel, sheet metal end plates 133, 134 extending outwardly from and mounted upon the angle plate 23. The end plates 133, 134 function as side shields of the entire work holding fixture 15 and are provided with arcuate cutouts 135. Cooperating with the cutouts 135 are arcuate shields 137, a pair of which is carried at opposite ends of each of the tables 17, with respective ones of the arcuate shields 137 being positioned adjacent to the respective cutouts 135. The two shields 137 are co-planar with the sheets 133, 134 and are only slightly smaller in diameter than the cutouts 135 in the sheets. Additionally, arcuate strips 138 are welded to the sheets 133, 134 which overlap the slight spaces left between their arcuate cutouts and the shields 137 which turn within them so that an effective seal in the form of a labyrinth is formed between them. Furthermore, the ends of the flexible shields 119 extend right up to and abut the arcuate shields 137 so that a complete shield is formed between adjacent ones of the tables 17 by the flexible shield 119, the arcuate end shields 137, and the end plates 133.

Continuing with the description of the flexible shield arrangement, the upper edge of the top table 17 is enclosed by the additional flexible shield member 121. This shield too, runs the length of the table and is attached at one of its edges to the upper edge of the table by means of a clamping strip 125, similar to those by which the inter-table strips are attached to the work tables. The top shield member 121 is then trained around two sets of rollers 141 and 143, the latter being shown only in FIG. 16, and is secured at its opposite end to the top portions of the slides 35 by means of clamps 145. Similarly, the bottom shield 123 which may be substantially identical in configuration to the top shield 121 is attached at one of its long edges to the lower edge of the bottom table 17c, is then trained around two vertically spaced apart sets of rollers 149 and 151, and is secured at its opposite edge to the bottom portion of the slides 35 by means of clamps 153.

As may be seen in FIGS. 13–15, the top sets of rollers 141 and 143 are mounted on bars 155 and 157, respectively, and the bottom sets of rollers 149 and 151 are mounted on bars 159 and 161 respectively. Similar to the inter-table guide roller supporting bars 131, the supporting bars 155–161 are positioned in the same vertical plane and are similarly mounted at their opposite ends upon the end plates 133, 134.

In combination, the top flexible shield 121, the intermediate flexible shields 119, and the bottom flexible shield 123, together with the sildes 35 and the tables 17 comprise a continuous loop of moving elements. As the slides 35 move up or down along their respective bases 31 in the columns 19 and 21, and as the tables 17 rotate in unison with the movement of the slides, the shields 121, 119, 123 move smoothly without stretching and provide continuous closure of the spaces between the tables 17 and also between the top and the bottom edges of the top and bottom tables 17a and 17c and the drive mechanism attached thereto. For example, let it be assumed that from an initial position, with the table surfaces 18 level with the angle plate work surface 25, as shown in FIG. 14, the slides 35 are moved down so as to tilt the work plates 85 of the tables 17 upward. As the slides 35 are lowered, the bottom flexible shield 123 is released or "paid out" by a sufficient amount to permit its opposite edge, attached to the bottom edge of the table 17c to be pulled away from the slide 35, as seen in FIG. 15. Similarly, referring to the top flexible shield 121, as that portion of the shield which extends from the top edge of the table 17a is "paid out" due to the rotation of the table which brings the top edge of the table closer to the top rollers 141, the opposite edge of the shield 121 is moved downward along with the slides 35, thus, taking up the slack and keeping the shield in a relatively taut position. Any slack created in the inter-table shields 119 due to rotation of one of the tables 17 to which such a shield is attached is taken up by the equal rotation of the other table to which the opposite edge of such a shield is attached.

To provide further protection of the belt drive mechanisms against contaminants, an inner honeycomb of interfitting shielding elements is provided. Generally, these rigid shielding elements include a first series of relatively long and narrow, flat bottomed pan members running parallel to the axes of the tables 17, and a second series of wall members running along the support columns 19 and 21 at right angles to and intersecting the first series of shielding elements. With particular reference to FIGS. 5, 13, 14 and 15, the first series of shielding elements is seen to include a pair of sheet metal pans 163 and 165 respectively mounted between the tables 17a and 17b and the tables 17b and 17c. The pans 163, 165 are mounted upon the bases of the table supporting brackets 63, 65 and 67, with the flat central portions of the pans being spaced below the rollers 129 to define together with the rollers a guide slot through which the flexible shields 119 may pass. In length the pan members 163 and 165 extend between and are attached to the end plates 133 and 134 (FIG. 13) thus providing additional bracing, therefor. As seen in FIGS. 6 and 13, the pans 163 and 165 have raised edges upon each of which a set of wiper blades or scrapers 167 are positioned against, and in light contact with, the drive bands 80, 81 so as to remove from their surfaces any metal chips which might otherwise be carried between the drum members 87 and the anchor blocks 73, 75 and 77.

In addition to the two inter-table pans 163 and 165, there is also provided an additional, narrower pan 169 extending above the top table 17a and a fourth pan 171, extending below the bottom table 17c. Both of the pans 169 and 171 have raised edges carrying wiper blades 167 of the type just described so as to clean the drive bands 81a, b, near the top of the upper table 17a and the drive bands 80 around the bottom portion of the lower table 17c.

The pans 163, 165, 169 and 171 provide a substantially continuous, rigid shield lying between the slides 35 and the axes about which the tables 17 revolve, interrupted only by horizontally extending openings between the facing, raised edges of adjacent pan members through which the driving bands 80 and 81 emerge to extend around the curved rear surface of the tables. In order to fully enclose the area where the driving bands 80 and 81 emerge from beneath the pan members, there is provided for each of the driving and support columns 19 and 21 a pair of parallel wall members mounted upon and extending away from respective ones of the columns with the drive bands 80 and 81 between them. In carrying out this aspect of the invention in the preferred embodiment, the parallel wall members referred to are part of the slide retaining plates 51 previously described with reference to FIGS. 8 and 10 and appear in the latter figure as the upright extensions 51a. To provide a close fit with the semicylindrical rear surfaces 20 of the tables 17 the wall extensions 51a on both sides of the driving bands 80 and 81 have arcuate surfaces 51b spaced in registry with the tables 17 and dimensioned so as to interfit with their drum members 87. Cooperating with the wall extensions 51a, the pan members 163 and 165 which are mounted upon the columns 19 and 21 at right angles to the wall extensions, extend in width across the space between the arcuate wall surfaces receiving the rear surfaces of adjacent ones of the tables 17 (FIG. 5). To enhance the effectiveness of the seals formed between the arcuate surfaces 51b and the drums 87, the arcuate surfaces 51b are slotted to retain a felt seal 175 which bears against the drums.

Summarizing the foregoing description of the principal shielding components of the fixture 15, an outer shielding layer is provided by the flexible sheets 119, 121 and 123, and by the side plates 133 and 134 in cooperation with the arcuate end shields 137 mounted on the tables 17. This outer shielding is completed by a top shield 177 and a bottom shield 179 as shown in FIG. 4. A second layer of protective shielding is provided by the rigid long pans 163, 169 and 171 in cooperation with the raised wall members 51a.

In operation, the tables 17 are required to swivel in unison according to a command signal originating from a numerical control system. As mentioned above, with reference to FIG. 2 the respective slides 35 housed in the drive columns 21 and 19 are driven by separate servomotors 59 and 60 through individual ball nut and screw drive trains 57, 61, and 58, 62. In the preferred embodiment described herein and in particular as shown in FIGS. 3 and 4, the respective servomotors 59 and 60 are mounted above the drive columns 21 and 19 by a pair of fixtures 185, 187 bolted to the top side of the angle plate 23. As shown in FIG. 4, the screw 62 is rotatably supported near its top end by a set of antifriction bearings 186 mounted in the ceiling of the fixture 185, and the screw 61 is similarly supported by a set of bearings in the fixture 187.

Referring to FIG. 19, the servomotors 59 and 60 are actuated under the control of servo command signals produced by a numerical control 184 which receives position feedback signals produced by resolvers 188 and 188'. This is a well known servo system and will not be described here. It will suffice to say that the feedback signals produced by the resolvers 188 and 188' accurately represent at all times the position of the respective slides 35.

As part of the machine incorporating the present invention resolver means 188 are provided for producing an electrical feedback signal which indicates the position of the slides 35 and therefore the orientation of the tables 17 with great accuracy. Referring to FIGS. 16, 17 and 18, the device 188 includes a scale 189 and a slider 191. The scale 189 is carried on an elongtaed support 193 bolted to the base member 31 of the drive column 19 and is oriented with its longitudinal axis parallel to the slide 35. The slider 191 is mounted in cooperative relationship with the scale 189 by means of a bracket 195 bolted on and, extending from the top edge of, the slide 35. Thus, as the slide 35 is moved vertically relative to the base member 31 of the drive column 19, the slider 191 which is attached to the slide 35 of the drive column moves a corresponding distance relative to its associated scale 189.

The scale 189 and the slider 191 shown herein together comprise a linear resolver, a particularly widely used type of which is sold under the name Inductosyn. Linear electrical resolvers are well known and their electrical detais need not be described here. Suffice it to say that as the sider 191 is moved relative to the scale 189, an electrical signal is produced whose phase shifts by an amount which is representative of the amount of the relative movement between slider and scale. In a commercially available type of Inductosyn, each .100 inch of relative motion between scale and slider produces a complete cycle, or 360°, of phase shift in the output signal. In practice then, as indicated in FIG. 19, the feedback signals generated by the resolvers 188, 188' are applied to the numerical control 184 which in response thereto produces servo command signals which are then applied to the servomotors 59 and 60. Thus, by means of linear resolvers 188 and 188' comprised of the scale and slider here described, an accurate indication of the vertical position of the slides 35 and of the attitude of the tables 17 moved by the slides is given at all times, allowing the accurate positioning and orientation of the tables by the numerical control unit 184. Rotary resolvers may be used in place of the linear resolvers 188 and 188' with respective ones of the rotary resolvers being coupled to the screws 61 and 62 through individual reduction gear boxes in a manned well known to those skilled in the art.

From the foregoing, it may be seen that there has been provided an apparatus which may be readily attached to machine tools and in particular to milling machines so as to produce a plurality of work surfaces which may be tilted individually, but in unison. The apparatus incorporating the features of the invention is very accurate due to elimination of backlash by the use of drive bands having negligible stretch and provided with means for adjusting their tension. Further, the disclosed apparatus is trouble-free and will continue to maintain the angular relationship between the several work surfaces which are pivotably mounted thereon for long periods and under adverse operating conditions, such as a heavy spray of coolant and flying chips, by completely enclosing the positioning and drive mechanism for the tables, thereby preventing the accuracy of the apparatus from being disturbed by the deposit of coolant or the entry of metal chips on the working surfaces of the devices. Finally, not only does the disclosed apparatus maintain the relative angular relationships of the several work surfaces constant, it is also capable of accurately indicating the actual attitudes of the work surfaces throughout their entire range of travel.

Although a particular embodiment of the invention has been disclosed herein, various alterations, modifications, and additions may be made without departing from the spirit and scope of the invention. For example, the pivotably mounted work surfaces have been disclosed as mounted to swivel about vertically spaced, horizontally extending axes. This is suitable for a machine wherein the machine head stock includes a vertically stacked plurality of spindles. It will be appreciated, however, that if for some reason it is desired to use a head stock having a horizontally arranged array of spindles, the invention could be used by mounting the tables so as to swivel about vertical axes. Thus, the tables could be mounted on laterally spaced, vertically extending swive axes, and correspondingy, the driving columns would be horizontal and verticaly extending as shown in the embodiment shown herein.

I claim as my invention:

1. A multi-surface work holding fixture adapted for mounting on a single vertical work-supporting surface and comprising, in combination
   (a) a pair of support columns;
   (b) means for mounting said suport columns upright and horizontally spaced apart from one another upon said work-supporting surface;
   (c) a vertically movable slide member in each said support column;
   (d) a plurality of elongated work-supporting tables each having a semicylindrical rear surface and a flat work-supporting surface;
   (e) means on said support columns and on said tables for mounting said tables on said columns pivotably about individual horizontal axes distributed vertically in a common plane parallel to said singe work-supporting surface;

(f) a set of flexible steel bands mounted on each said slide member, each said set including at least a pair of bands for each of said tables, said pair of bands being tightly wrapped in opposite directions around the rear surfaces of, and anchored on, said tables so as to maintain the work-supporting surfaces of all of said tables parallel with one another; and (g) means for moving said slide members in unison.

2. In a multi-surface work holding fixture the combination comprising (a) a pair of upright columns each having walls defining a vertical channel, (b) a slide member in each said channel, (c) a work-supporting table mounted upon said columns for rotation about a horizontal axis, said table having a semicyclindrical rear surface generated around said axis, (d) an anchor block mounted upon each said side member between said table and respective ones of said columns, (e) first and second spaced-apart bands attached at one of their ends to each said anchor block, at their opposite ends to said table, and wound intermediate their ends around said rear surface in a first direction, (f) a third band situated between and lying parallel to said first and second bands attached at one end to said anchor block, at the other end to said table, and wound intermediate its ends around said rear surface in a second direction, (g) first and second pairs of parallel upright wall members mounted upon respective ones of said columns, with said spaced-apart bands between them and each pair of wall members having mutually aligned arcuate surfaces receiving in close proximity a portion of said rear table surface, and (h) first and second pan members mounted on said columns and respectively extending horizontally above and below the axis of said table across and between said columns, said pan members mounting raised scraper surfaces in close proximity with, and substantially extending along the widths of, said bands.

3. The combination of claim 2 wherein said wall members have bases extending over said channels for retaining said slide members therein.

4. In a multi-surface work holding fixture the combination comprising (a) a pair of upright support columns, (b) a vertically movable slide member in each said support column, (c) a plurality of work-supporting tables pivotably mounted upon said support columns for swiveling about individual horizontal axes distributed vertically in a common vertical plane, each of said tables having a long flat work-supporting surface, (d) drive means for moving said slide members in unison, (e) coupling means connected between said slides and said tables and confined below said work-supporting surfaces for moving said tables with their work-supporting surfaces held parallel in response to said slide movement, (f) a plurality of flexible sheets substantially coextensive with said tables in length, respective ones of said sheets extending in width between, and attached to, adjacent ones of said tables, and (g) means defining a guide slot for said sheets between each pair of adjacent tables, said slots being located between said vertical plane of table axes and said support columns and said sheets moving smoothly through said slots always below said work-support surfaces as said tables are caused to swivel.

5. The combination of claim 4 additionally including (a) a top flexible sheet substantially coextensive with the top table and extending in width between, and attached to, the top edge of said top table and the upper end portions of said slide members, (b) a bottom flexible sheet substantially coextensive with the bottom table and extending in width between, and attached to, the bottom edge of said bottom table and the bottom end portions of said slide members, and (c) means defining a guide slot for said top and bottom sheets above and below said top and bottom tables and between said vertical plane of table axes and said columns, respective ones of said top and bottom sheets moving through said slots, (d) said flexible sheets, together with the work-support surfaces of said tables between them, defining a continuous unbroken protective shield for said coupling means moving together smoothly as said tables are swiveled about their axes.

6. The combination of claim 5 wherein each of said means defining a guide slot includes at least one shaft extending the full length of said tables and rollers distributed along and mounted upon said shaft.

7. The combination of claim 6 wherein said means defining a guide slot further includes a substantially flat-bottomed, relatively long and narrow pan member with raised edges along its sides, said pan member being mounted upon said support columns with its bottom closely spaced from said rollers, between said rollers and said support columns, and extending in length along a respective one of said tables so that at least one of its raised edges extends in close proximity to the bands swiveling said table.

8. A multi-surface work holding fixture adapted for mounting on a single flat work-supporting surface and comprising in combination (a) a pair of support columns having longitudinal axes;

(b) means for mounting said support columns on said work-supporting surface in spaced-apart mutually parallel relationship;

(c) slide members mounted on each of said support columns for movement along their respective longitudinal axes;

(d) a series of work tables extending in length substantially across both of said columns, each of said tables having a curved rear surface and a flat work-supporting surface;

(e) means for mounting said work tables upon said support columns pivotably about individual mutually parallel axes lying at right angles to said longitudinal axes and in a common plane parallel to that containing said longitudinal axes;

(f) a set of flexible bands mounted on each said slide member for collectively swiveling all of said work tables, each said set including at least a pair of bands for each one of said tables, said pair of bands being tightly wrapped in opposite directions around the rear surface of, and anchored on, said one table so as to maintain the work-supporting surfaces of all of said tables mutually parallel for all swivel positions thereof; and (g) means for moving said slide members in unison.

9. The combination of claim 8 wherein said at least a pair of bands includes a group comprising first and second spaced-apart bands wrapped around said rear surface in a first direction and a third band wrapped around said rear surface in the opposite direction between said first and second straps.

10. The combination of claim 9 wherein each of said group of bands is atached to one of said slides by means of an individual anchor block mounted upon said slide behind the table to which said group of bands is attached.

11. The combination of claim 10 additionally including (a) first and second pairs of parallel wall members mounted upon, and extending away from, respective ones of said columns with said bands between them and each pair of wall members having pairs of mutually aligned arcuate surfaces receiving a portion of the rear surface of one of said tables, and (b) a plurality of pan members mounted upon said columns at right angles to said wall members, and extending in length along the full length of said tables, respective pan members extending in width across the space between the arcuate wall surfaces receiving the rear surfaces of adjacent ones of said tables.

12. The combination of claim 11 additionally including a plurality of scraper members carried upon said pan members and held in light contact with all of said bands.

13. For use with a numerical machine tool control wherein servo command signals are produced in response to feedback signals, a multi-surface work holding fixture adapted to be mounted on a single work support surface and operative to swivel a plurality of work support surfaces in unison in response to said servo command signal comprising, in combination (a) a pair of support columns;
(b) means for mounting said support columns parallel to one another on said work-supporting suprface;
(c) an axially movable slide in each said support column;
(d) a plurality of work tables having individual flat work-suporting surfaces and mounted pivotably upon said support columns to permit swiveling about individual parallel axes distributed in a common plane parallel to said single support surface;
(e) individual servo drive means on each said column, for moving said slides along said columns;
(f) bands connected between said slides and said tables for swiveling said tables in response to movement of said slides along said columns;
(g) means for producing an individual position feedback signal for each of said slides, said means including stationary elements mounted on respective ones of said columns, and movable elements connected to the slides in the respective columns opposite said stationary elements;
(h) means for applying said position feedback signals to said numerical control; and
(i) means for applying the servo command signals produced by said numerical control to said servo drive means.

14. The combination of claim 13 wherein said tables each have hemispherical rear surfaces generated around their respective axes, and wherein each of said slides carries several groups of bands, each group for a respective one of said tables, each group including a first band wrapped around one of said rear surfaces in a first direction and a second band wrapped around said one rear surface in the opposite direction, all of said bands being adjusted to maintain all of said table surfaces mutually parallel.

References Cited

UNITED STATES PATENTS 3,371,580   3/1968   Barnes et al. _____ 90—11

ANDREW R. JUHASZ, Primary Examiner

G. WEIDENFELD, Assistant Examiner

U.S. Cl. X.R.

90—11